United States Patent [19]
Wert et al.

[11] 4,056,867
[45] Nov. 8, 1977

[54] ELEVATOR BELT SPLICE

[75] Inventors: Edward Wert; Chester Donald Fisher, both of Muncy, Pa.

[73] Assignee: Koppers Company, Inc., Pittsburgh, Pa.

[21] Appl. No.: 717,258

[22] Filed: Aug. 24, 1976

[51] Int. Cl.² ............................................. F16G 3/08
[52] U.S. Cl. ...................................................... 24/37
[58] Field of Search ..................... 24/31 R, 34, 36, 37, 24/38

[56] References Cited
U.S. PATENT DOCUMENTS

| | | | |
|---|---|---|---|
| 1,686,300 | 10/1928 | Vollrath | 24/37 |
| 1,803,354 | 5/1931 | Purple | 24/37 |

FOREIGN PATENT DOCUMENTS

| | | | |
|---|---|---|---|
| 2,231,322 | 6/1972 | Germany | 24/37 |
| 612,373 | 11/1948 | United Kingdom | 24/37 |

Primary Examiner—G. V. Larkin
Attorney, Agent, or Firm—Thomas L. Sivak; Oscar B. Brumback

[57] ABSTRACT

A splicer element for a belt includes juxtaposed splice or clamp elements with a spacer element disposed between the clamp elements. The ends of the belt are disposed between the clamp elements and the spacer element. The surfaces of the clamp elements and the spacer element that contact the belt surfaces are rough, whereby the frictional holding properties of the belt splicer element are greatly increased. One form of surface roughness is a plurality of projections that dig into and may pierce the belt material.

4 Claims, 7 Drawing Figures

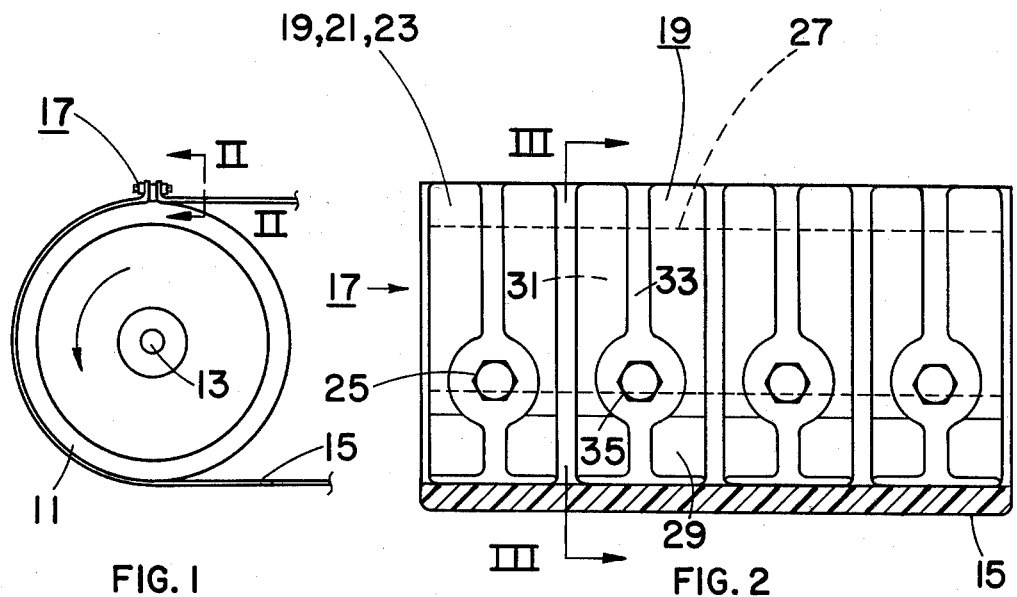
FIG. 1
FIG. 2
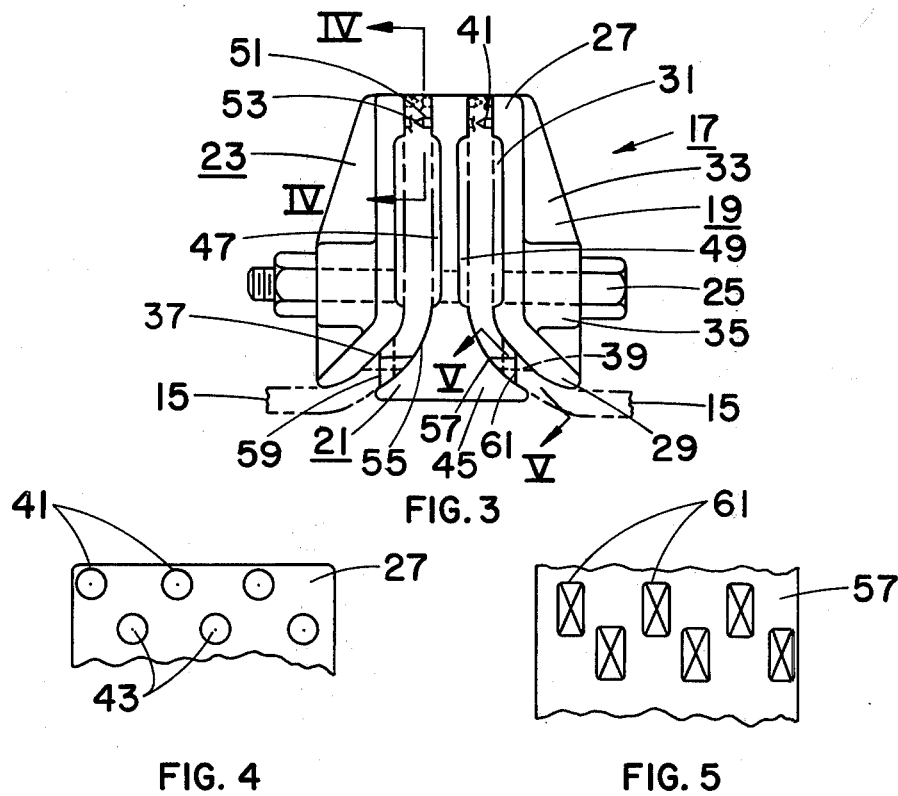
FIG. 3
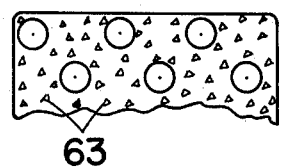
FIG. 4
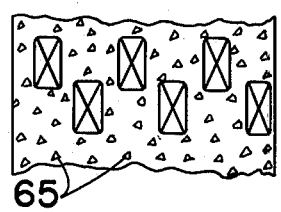
FIG. 5
FIG. 6
FIG. 7

8,056,867

ELEVATOR BELT SPLICE

BACKGROUND OF THE INVENTION

Bar clamps for belts operating over pulleys have, heretofore, comprised two opposing plates between which the outwardly turned ends of the belts have been clamped. At one time such bar clamps were a unitary rigid structure such as the structure shown and described in U.S. Pat. No. 1,543,559. But, because these bar clamps were rigid, they were not adaptable to the crown surface of the pulleys over which the belt moved. As a result, the belts wore unduly at the center of the belt surface under the rigid belt clamp.

Later, an improved belt clamp, comprising a plurality of individual bar sections, was proposed, such as are represented by the structure shown and described in U.S. Pat. No. 2,029,162.

Further developments have been necessary as a result of the use of stronger belts made of synthetic fibers that are stronger and tougher than the cotton and rayon fiber belts used heretofore. Also, covers for belts have changed from rubber, as used heretofore, to polyvinyl chloride (PVC). As a result of these improvements in belts, the capability of the belt splice to develop enough frictional holding power has not kept pace with the improvements in belt technology.

SUMMARY OF THE INVENTION

In a splicer for a belt comprising juxtaposed splicer elements between which is a spacer element with the belt ends disposed between the spacer element and the splicer elements, and with an adjustable means for drawing the splicer elements toward each other and thereby compressing the belt end portions, the improvement in the splicer elements and the spacer element comprises means for roughening the surfaces of the splicer elements that contact the belt end portions, and other means for roughening the surface portion of the spacer element that contacts the belt end portions.

For a further understanding of the invention and for features and advantages thereof, reference may be made to the following description and the drawing which illustrates a preferred embodiment of equipment in accordance with the invention.

BRIEF DESCRIPTION OF THE DRAWING

In the drawing:

FIG. 1 is a schematic view of a belt splice shown passing over a pulley;

FIG. 2 is a view along line II—II of FIG. 1 showing, at an enlarged scale, a clamp for splicing a belt in accordance with the present invention;

FIG. 3 is a view along line III—III of the clamp of FIG. 2;

FIG. 4 is a view along line IV—IV of the clamp of FIG. 3;

FIG. 5 is a view along line V—V of the clamp of FIG. 3;

FIG. 6 is a view similar to that of FIG. 4, but of a modification thereof; and

FIG. 7 is a view similar to that of FIG. 5, but of a modification thereof.

DETAILED DESCRIPTION

Referring to FIG. 1, a pulley 11 rotating about shaft 13 is partially surrounded by a belt 15 which is spliced, as at 17.

The splice 17 of belt 15 is comprised of a plurality of spaced apart splicer units, each one comprising three parts 19, 21, 23, and a bolt and nut fastener 25. Two of the three main parts 19, 23 are identical splicer elements, so that only one of such splicer elements 19 will be described herein.

Splicer element 19 comprises a casting preferably, that includes an upstanding (as viewed in FIGS. 2 and 3) planar portion 27 that merges with an angularly attached foot portion 29. The upstanding planar portion 27 has a recess 31 in one face thereof, and a rib 33 integrally formed on the opposite face thereof. The rib 33 merges with a boss 35 and it, as well as the upstanding portion 27, are drilled through to receive fastener 25. The foot portion 29 has a planar surface portion 37 that coacts with the belt 15.

The present invention comprises an improvement in the splicer elements and in the spacer element. More particularly, the improvement comprises means for increasing the frictional holding capacity of the splicer and spacer elements in contact with the belt ends. The following description discloses ways to roughen the surface of the splicer and spacer elements that contact the belt ends in accordance with the invention.

The planar portion 37, shown in FIG. 3, has thereon a plurality of spaced apart pyramidal projections 39, while the upstanding planar portion 27, above the recess 31, has a plurality of pins 41 having points 43 mounted thereon in spaced apart arrangement, as shown in FIG. 4. The third main part 21 is a spacer element 45 that is disposed between the splicer elements 19, 23 and that has the general end view shape as shown in FIG. 3. Like the splicer elements 19, 23, that have recesses 31 in the surface facing the belt end, the spacer element 45 has two recesses 47, 49 that are opposite the recess 31 in the splicer elements 19, 23.

Also, like the splicer elements 19, 23, the spacer 45 has, on both opposing top surfaces, pins 51, having conical points 53 that are arranged in non-interfering spaced apart relation with respect to the pins 41 on the surface of the splicer elements 19, 23. Like the splicer elements 19, 23, the lower curved surfaces 55, 57 of the spacer element 45 have a plurality of pyramidal projections 59, 61 arranged in non-interfering spaced apart relation with respect to the pyramidal projections 39 on the splicer elements 19, 23.

FIG. 6 illustrates schematically a modification of the way to roughen the structure shown in FIG. 4 and described previously herein. The top vertical surfaces of both the splicer elements 19, 23, to which the pins 41 are secured, are treated in such a way that the surfaces between the pins are roughened. One way to treat such surfaces is by spraying particulate material, such as tungsten carbide particles 63 onto the surfaces. But, any other way to treat the surfaces, that produces a gritty or rough surface that increases the friction between the metal of the units 19, 21, 23 and the belt material is acceptable.

FIG. 7, like FIG. 6, illustrates schematically a modification of the structure shown in FIG. 5 and described previously herein. The curved surfaces 55, 57 between the pyramids 61, and the corresponding surfaces of each foot portion 29, are roughened by applying thereto particulate material such as tungsten carbide particles 65. Those skilled in the art will understand, however, that other substances may be applied to the curved surfaces and to the foot portions in any suitable manner.

In use, the several splice or clamp elements are arranged as shown in FIG. 2 with the ends of the belt 15 therebetween. The fasteners 25 are tightened and the end of the belt, if any protrude beyond the top edges of the splice or clamp elements, may be trimmed.

From the foregoing description of one embodiment of the invention, those skilled in the art should recognize many important features and advantages of it, among which the following are particularly significant:

That the pyramidal projections on the curved surfaces of the splicer elements are located well away from the bolt-type fastener and the upper holding pins, whereby considerable force is transferred from the pins and bolt into the splicer elements. The bolt and the upper pins are thereby relieved of a large part of the holding force required to prevent slippage between the belt ends and the three parts 19, 21, 23;

That pins are used at the top of each splice or clamp element to obtain maximum penetration into the belt without damage to the belt or the fibers of the belt; and That the added rough surface of the splicer elements and spacer element is beneficial in increasing significantly the friction between the belt and the three parts 19, 21, 23, whereby the holding and the anti-slippage properties of the present belt splice is greatly enhanced.

Although the invention has been described herein with a certain degree of particularity it is understood that the present disclosure has been made only as an example and that the scope of the invention is defined by what is hereinafter claimed.

What is claimed is:

1. In a splicer for a belt comprising juxtaposed splicer elements between which is a spacer element, with belt ends disposed between the spacer element and the splicer elements, and with adjustable means for drawing the splicer elements toward each other and the spacer element thereby compressing the belt end portions, the improvement comprising:
   a. the splicer elements having a plurality of belt contacting surfaces, said belt contacting surfaces disposed on the ends of the splicer elements,
   b. a spacer element having a plurality of belt contacting surfaces, said belt contacting surfaces disposed on the opposing surfaces of the spacer element on the ends thereof,
   c. first means projecting from said belt contacting surfaces of said splicer means, said first projecting means adapted to engage said belt ends; and
   d. second means projecting from said belt contacting surfaces of said spacer means, said second projecting means adapted to engage said belt ends.

2. The splicer for a belt of claim 1 wherein said second projecting means are arranged in non-interfering spaced apart relation with respect to said first projecting means.

3. The splicer for a belt of claim 2 wherein the first projecting means disposed on the belt-contacting surface on one end of the splicer elements includes pins having tapered points and the remainder of the first projecting means disposed on the belt contacting surface on the opposite end of the splicer elements includes pyramids, the second projecting means disposed on the belt-contacting surfaces on one end of the spacer element includes pins having tapered points arranged in non-interfering spaced relationship to said pins on said splicer elements; and the remainder of the second projecting means disposed on the belt-contacting surfaces on the opposite end of the spacer elements includes pyramids arranged in non-interfering spaced relationship to said pyramids on said splicer elements.

4. The splicer for a belt of claim 3 wherein the belt-contacting surfaces surrounding said first and second projecting means are adapted to frictionably engage the surfaces of said belt ends.

* * * * *